United States Patent [19]

Nakachi et al.

[11] Patent Number: 5,028,676

[45] Date of Patent: Jul. 2, 1991

[54] RESIN FOR MAGNETIC RECORDING MEDIA FROM VINYL CHLORIDE WITH QUANTERNARY AND PHOSPHORIC MONOMERS

[75] Inventors: Takeshi Nakachi; Akio Hata, both of Shinnanyo; Yoshihisa Watanabe, Uji, all of Japan

[73] Assignee: Sekisui Kagaku Kogyo Kabushiki Kaisha, Osaka, Japan

[21] Appl. No.: 371,498

[22] Filed: Jun. 26, 1989

[51] Int. Cl.$^5$ ............................................. C08F 230/02
[52] U.S. Cl. .................................... 526/277; 526/287; 526/292.2; 526/317.1
[58] Field of Search ............ 526/277, 278, 287, 292.2, 526/318.25

[56] References Cited

U.S. PATENT DOCUMENTS

| | | | |
|---|---|---|---|
| 4,163,092 | 7/1979 | Steckler | 526/263 |
| 4,190,717 | 2/1980 | Suzuki et al. | 526/62 |
| 4,272,622 | 6/1981 | Kitamura | 526/62 |
| 4,560,728 | 12/1985 | Lewarchik et al. | 525/123 |
| 4,687,824 | 8/1987 | Vaughn | 526/292.2 |
| 4,737,357 | 4/1988 | Lehmann | 424/487 |
| 4,741,953 | 5/1988 | Katsuta et al. | 428/323 |
| 4,844,991 | 7/1989 | Miura et al. | 428/694 |
| 4,851,289 | 7/1989 | Ogawa et al. | 428/329 |
| 4,861,683 | 8/1989 | Nakachi et al. | 428/694 |

FOREIGN PATENT DOCUMENTS

| | | |
|---|---|---|
| 3516781 | 11/1985 | Fed. Rep. of Germany . |
| 3530077 | 2/1986 | Fed. Rep. of Germany . |
| 2584522 | 7/1986 | France . |
| 5173583 | 12/1974 | Japan . |
| 56-101626 | 1/1980 | Japan . |
| 57-198710 | 6/1981 | Japan . |
| 61-26132 | 6/1986 | Japan . |
| 626429 | 1/1987 | Japan . |

*Primary Examiner*—Christopher Henderson
*Attorney, Agent, or Firm*—Irell & Manella

[57] ABSTRACT

A resin used for magnetic recording media, comprising a vinyl chloride copolymer containing vinyl monomers with hydroxyl groups and vinyl monomers with quaternary ammonium salt groups as component units. The resin is made by a method which comprises polymerizing an organic solvent solution containing vinyl chloride, vinyl monomers with hydroxyl groups and vinyl monomers with quanternary ammonium salt groups in a reacting apparatus to thereby precipitate a vinyl chloride copolymer, the interior surface of said reactin apparatus, which comes into contact with said organic solvent solution being coated with a fluororesin.

2 Claims, No Drawings

RESIN FOR MAGNETIC RECORDING MEDIA FROM VINYL CHLORIDE WITH QUANTERNARY AND PHOSPHORIC MONOMERS

This application is a division of application Ser. No. 236,350, filed Aug. 22, 1988, now U.S. Pat. No. 4,861,683, which is a continuation of Ser. No. 030,457, filed Mar. 25, 1987, now abandoned.

BACKGROUND OF THE INVENTION

1. Field of the Invention

This invention relates to a resin having excellent dispersion characteristics used for magnetic recording media, which constitutes a magnetic layer that contains magnetic powder, resulting in excellent abrasion resistance, and a method for the production of the resin.

2. Description of the Prior Art

Magnetic recording media used for magnetic videotapes and magnetic disks, etc., are usually obtained by coating, orienting and drying a magnetic coating on a medium made of polyester, etc. The said media must have excellent magnetic characteristics, electromagnetic transforming characteristics and be durable. The magnetic coating includes magnetic powder and a resin by which the magnetic powder adheres to the media. Accordingly, resins used for magnetic recording media must have characteristics by which excellent dispersion of magnetic powder can be achieved in a magnetic coating, resulting in a magnetic layer having a high squareness ratio, and moreover, by which a magnetic layer having excellent abrasion resistance and excellent heat resistance is formed on the substrate. Especially, in recent years, the development of resins that are excellent in dispersion characteristics has become necessary with the atomization of magnetic powder based on an increased recording density thereof in the magnetic recording media.

As a resin having these excellent characteristics, vinyl chloride—vinyl acetate—vinyl alcohol copolymers (disclosed in, e.g., Japanese Patent Publication No. 61-26132), etc., are used, and when a high level of abrasion resistance of the magnetic layer is required, a resin containing the said copolymer and isocyanate compounds is used for the production of the magnetic recording media. However, these vinyl chloride—vinyl acetate—vinyl alcohol copolymers are inferior in dispersion characteristics into the magnetic coating. Vinyl chloride copolymers to be generally used for magnetic recording media are usually produced by the precipitation polymerization method as a modified method of the solution polymerization method. According to this precipitation polymerization method, since the resulting polymer is precipitated, the removal of the solvent and the residual monomers after the polymerization is readily carried out and the use of a dispersant and/or an emulsifier is not required. However, when the vinyl chloride copolymers are produced in a stainless steel reacting apparatus, a part of the copolymers deposits and adheres to the inside of a reacting apparatus, which makes the composition thereof uneven. Moreover, the removal of the deposited scales from the reacting apparatus is troublesome.

SUMMARY OF THE INVENTION

The resin used for magnetic recording media of this invention, which overcomes the above-discussed and numerous other disadvantages and deficiencies of the prior art, comprises a vinyl chloride copolymer containing vinyl monomers with hydroxyl groups and vinyl monomers with quaternary ammonium salt groups as component units.

In a preferred embodiment, the resin further comprises an isocyanate compound.

In a preferred embodiment, the content of the vinyl monomers with hydroxyl groups in the vinyl chloride copolymer is in the range of 1 to 30% by weight.

In a preferred embodiment, the content of the vinyl monomers with quaternary ammonium salt groups in the vinyl chloride copolymer is in the range of 0.05 to 8% by weight.

In a more preferred embodiment, the content of the vinyl chloride is in the range of 60 to 95% by weight, that of the vinyl monomers with hydroxyl groups is in the range of 1 to 30% by weight, and that of the vinyl monomers with quaternary ammonium salt groups is in the range of 0.05 to 8% by weight in the vinyl chloride copolymer.

In a preferred embodiment, at least one of the vinyl monomers with quaternary ammonium salt groups is methacryloyloxyethyltrimethylammonium chloride.

In a preferred embodiment, the vinyl chloride copolymer further contains vinyl monomers with acid radicals as a component unit.

In a more preferred embodiment, the content of the vinyl monomers with hydroxyl groups in the vinyl chloride copolymer is in the range of 1 to 30% by weight.

In a further more preferred embodiment, the contents of the vinyl monomers with quaternary ammonium salt groups and the vinyl monomers with acid radicals are in the range of 0.05 to 8% by weight, respectively, in the vinyl chloride copolymer, their total content being in the range of 0.1 to 10% by weight.

In a further more preferred embodiment, the content of the vinyl chloride is in the range of 60 to 95% by weight, that of the vinyl monomers with hydroxyl groups is in the range of 1 to 30% by weight, and those of the vinyl monomers with quaternary ammonium salt groups and the vinyl monomers with acid radicals are in the range of 0.05 to 8% by weight, respectively, in the vinyl chloride copolymer, their total content being in the range of 0.1 to 10% by weight.

In a further more preferred embodiment, the vinyl monomers with acid radicals are vinyl monomers having phosphoric groups.

The method for the production of the resin of this invention comprises polymerizing an organic solvent solution containing vinyl chloride, vinyl monomers with hydroxyl groups and vinyl monomers with quaternary ammonium salt groups in a reacting apparatus to thereby precipitate a vinyl chloride copolymer, said interior surface of the reacting apparatus, which comes into contact with said organic solvent solution, being coated with a fluororesin.

In a preferred embodiment, the organic solvent solution further contains monomers with acid radicals.

The method for the production of vinyl chloride resins of this invention comprises polymerizing an organic solvent solution containing vinyl chloride, vinyl monomers with hydroxyl groups and vinyl monomers with quaternary ammonium salt groups in a reacting apparatus to thereby precipitate a vinyl chloride copolymer, the interior surface of said reacting apparatus, which comes into contact with said organic solvent solution, being coated with a fluororesin.

In a preferred embodiment, the organic solvent solution further contains monomers with acid radicals.

Thus, the invention described herein makes possible the objects of (1) providing a resin having excellent dispersion characteristics used for magnetic recording media which can constitute a magnetic layer that contains magnetic powder, and moreover that has excellent abrasion- and heat-resistance based on an optional addition of an isocyanate compound; (2) providing a resin having excellent dispersion characteristics used for magnetic recording media which can constitute a magnetic layer that contains magnetic powder and accordingly having a high squareness ratio; (3) providing a resin used for magnetic recording media which comprises a vinyl chloride copolymer that contains vinyl chloride constituting a hard and flexible magnetic layer in combination with other components; (4) providing a resin to be used for magnetic recording media, which consists of a copolymer made of vinyl monomers with hydroxyl groups and vinyl chloride, and when vinyl monomers with quaternary ammonium salt groups are used as a component of the copolymer, the dispersion characteristics of magnetic powder is surprisingly improved; (5) providing a resin used for magnetic recording media in which when the resin comprises a vinyl chloride copolymer containing vinyl monomers with acid radicals in addition to hydroxyl groups and with quaternary ammonium salt groups, the dispersion of the magnetic powder is further improved due to the multiplied effect between the vinyl monomers with quaternary ammonium salt groups (i.e., with cationic hydrophilic groups) and the vinyl monomers with acid radicals (i.e., with anionic hydrophilic groups); (6) providing a resin used for magnetic recording media in which when the resin contains isocyanate compounds, it constitutes a magnetic layer that is excellent in abrasion- and heat-resistance since the hydroxyl groups incorporated into the copolymer contribute to the crosslinking reaction of the copolymer with the isocyanate compounds; (7) providing a method for the production of the resin in which the precipitation polymerization method is adopted in a reacting apparatus the interior surface of which is coated with fluororesin, so that deposited scales are not created after polymerization, and accordingly there are no dangers that a copolymer having an ununiform composition will be produced due to said scales and also removal of the scales will not be required; and (8) providing a method for producing vinyl chloride copolymers without the occurrence of scales by use of the precipitation polymerization method.

DESCRIPTION OF THE PREFERRED EMBODIMENTS

The inventors searched for a resin to be used for magnetic recording media, which consists of a copolymer made of vinyl monomers with hydroxyl groups and vinyl chloride, and then realized this invention upon discovering that if vinyl monomers with quaternary ammonium salt groups are used as a component of the copolymer, the dispersion characteristics of magnetic powder is surprisingly improved and that if not only the said vinyl monomers with quaternary ammonium salt groups, which are cationic hydrophilic groups, but also vinyl polymers with acid radicals, which are anionic hydrophilic groups, are used as components of the copolymer, according to the multiplication effect of both functional groups, the dispersion characteristics of magnetic powder are exceedingly improved over those in which quaternary ammonium salt groups or acid radicals are independently used.

This invention was also realized on the basis of the findings of the inventors that the vinyl chloride copolymer can be produced without deposited scales produced by the polymerization of an organic solvent solution of vinyl monomers as a component of the copolymer in a reacting apparatus, the inside of which is coated with a fluororesin.

Vinyl chloride in the vinyl chloride copolymer of this invention results in moderate hardness and flexibility of the magnetic layer together with the other composition units. When the amount of vinyl chloride is too small, the abrasion resistance of the magnetic recording media is insufficient. When the amount of vinyl chloride is excessive, the solvent solubility thereof decreases. Accordingly, the content of vinyl chloride in the said vinyl chloride copolymer is set to be in the range of 60 to 95% by weight, preferably.

As vinyl monomers with hydroxyl groups used as a composition unit of the said copolymer, there are compounds, the structural formula of which, exhibits those of products of acrylic acid (or methacrylic acid) and polyhydric alcohols. Some examples of the compounds, i.e., (meth)acrylic ester (denoting both acrylic ester and methacrylic ester) are 2-hydroxyethyl(meth) acrylate (denoting both 2-hydroxyethylacrylate and 2-hydroxyethyl methacrylate), 2-hydroxypropyl-(meth)acrylate, 3-chloro-2-hydroxypropyl(meth)acrylate, polyethyleneglycolmono(meth)acrylate represented by the formula:

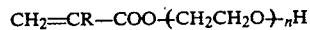

(wherein n is an integer of 2 to 9 and R is hydrogen or methyl), polypropyleneglycolmono(meth)acrylate represented by the formula:

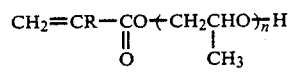

(wherein n is an integer of 2 to 6 and R is hydrogen or methyl), and 2-hydroxyethyl-2'-acryloyloxyethylphthalate

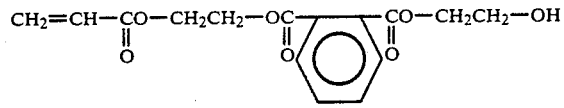

As vinyl monomers with hydroxyl groups used as a composition unit of the above-mentioned copolymer, there are also acrylamides or methacrylamides, an example of which is N-methylol (meth)acrylamide. These are used as a composition unit of the copolymer separately or in a suitable combination thereof. In particular, 2-hydroxyethyl(meth)acrylate and 2-hydroxypropyl(meth)acrylate are preferably used.

When the amount of vinyl monomers with hydroxyl groups used is excessive, the disadvantages arise that the solvent solubility of the said copolymer decreases, and the surface smoothness and moisture resistance of the magnetic recording media decrease. On the other hand, when the amount of vinyl monomers is too small the dispersion characteristics of the magnetic powder are decreased. Moreover, insufficient urethane bonding, due to the reaction with an isocyanate compound contained therein as desired, results in a decrease in the strength of the coated film and/or a blocking phenomenon in the recording media arises. Therefore, the vinyl monomers in the said copolymer are contained in the range of preferably 1 to 30% by weight, and more preferably 8 to 20% by weight.

Vinyl monomers with quaternary ammonium salt groups used in this invention mean vinyl monomers containing quaternary ammonium salt groups in the molecule, preferable examples of which are as follows: 2-hydroxy-3-methacryloyloxypropyl trimethylammonium chloride, methacryloyloxyethyl ammonium chloride, methacryloyloxyethyltrimethyl ammonium chloride, and trimethyl-3-methacrylamide propylammonium chloride. The vinyl monomers with quaternary ammonium salt groups greatly contribute to the improvement of the dispersion characteristics of the magnetic powder. When the amount of vinyl monomers is excessive, the disadvantages arise that the solvent solubility of the said copolymer decreases causing difficulty in obtaining a clear solution, the water resistance decreases, the heat stability decreases, the crosslinking effect attaining an improvement of the abrasion resistance cannot be achieved due to a side reaction except for the crosslinking reaction with an isocyanate compound contained, if necessary, and the pot life of the magnetic coating becomes short. On the other hand, when the amount of vinyl monomers is too small, the dispersion characteristics of the magnetic powder decrease. Therefore, the vinyl monomers with quaternary ammonium salt groups are contained in the range of preferably 0.05 to 8% by weight and more preferably 0.1 to 5% by weight in the copolymer. Quaternary ammonium salt groups can be incorporated therein from the polymer containing tertiary amines by the polymer reaction.

Vinyl monomers with acid radicals in this invention mean vinyl monomers containing, for example, phosphoric, carboxyl, sulfonic groups, and their metal salts. Monomers with carboxyl groups mean monomers containing carboxyl groups in the molecule and having an ability of vinyl polymerization, suitable examples of which are as follows: compounds having one carboxyl group in the molecule such as acrylic acid, methacrylic acid, monoacryloyloxyethyl succinate ester $(CH_2=CH-COO(CH_2)_2OCO(CH_2)_2COOH)$, monoacryloyloxyethyl phthalate ester, monomethacryloyloxyethyl succinate ester, and monomethacryloyloxyethyl phthalate ester, and compounds having some carboxyl groups in the molecule such as maleic acid and fumaric acid. Monomers with phosphoric groups mean monomers containing phosphoric groups in the molecule and having an ability of vinyl polymerization, suitable examples of which are as follows: acid phosphoxyethyl(meth)acrylate, acid phosphoxypropyl(meth)acrylate, and 3-chloro-2-acid phosphoxypropyl(meth)acrylate. Monomers with sulfonic groups mean monomers containing sulfonic groups in the molecule and having an ability of vinyl polymerization, suitable examples of which are as follows: 2-acrylamide-2-methylpropanesulfonic acid, acryl sulfonic acid, methacrylsulfonic acid, vinylsulfonic acid, and styrenesulfonic acid. In various combinations of functional groups, the combination of phosphoric groups and quaternary ammonium salt groups is particularly suitable from the viewpoint of an improvement in the dispersion characteristics of magnetic powder. Quaternary ammonium salt groups contribute to an improvement in the dispersion characteristics of magnetic powder due to a multiplied action together with acid radicals In the copolymer, vinyl monomers with quaternary ammonium salt groups and vinyl monomers with acid radicals are contained in the range of 0.05 to 8% by weight, respectively. The total content of both monomers is in the range of preferably 0.1 to 10% by weight and more preferably 0.1 to 5% by weight.

The resin of this invention can contain monomers such as ethylene, propylene, and vinyl acetate as a composition unit of the vinyl chloride copolymer as desired. Homopolymers or copolymers of the above-mentioned monomers can be used together with the vinyl chloride copolymer. The use of ethylene as a composition unit of the vinyl chloride copolymer is particularly suitable from the viewpoint of improvement of the solvent solubility of the vinyl chloride copolymer.

The vinyl chloride copolymer mentioned above can be produced by a known method of polymerization, e.g., the precipitation polymerization method, the solution polymerization method, the suspension polymerization method, and the emulsion polymerization method. The precipitation polymerization method is particularly preferable since neither a dispersant nor an emulsifier is required and since removal of the solvent and/or the residual monomers after polymerization is readily carried out. In this precipitation polymerization method, in order to prevent the occurrence of deposited scales on the inside of the reacting apparatus, the part of the interior surface of the reacting apparatus, which comes into contact with the monomer solution, is coated with a fluororesin.

As the solvent used for polymerization, organic solvents, which dissolve vinyl chloride, the above-mentioned monomer, having an ability of polymerization and a polymerization initiator therein, and which separates the produced copolymer therefrom, are used. Examples of these organic solvents are as follows: aliphatic alcohols such as methanol, ethanol, and butanol; saturated aliphatic hydrocarbons such as propane, butane, pentane, and hexane; saturated alicyclic hydrocarbons such as cyclobutane. The number of carbon atoms in the aliphatic alcohol is desired to be 1 to 5, and that in the saturated aliphatic and the saturated alicyclic hydrocarbon is desired to be 3 to 8 from the viewpoint of the solubility of the monomer. These organic solvents can be used as a mixture of more than two kinds of solvents. They can be, of course, of a mixture of alcohol and water. The selection thereof is performed depending upon the nature of the monomers used. Since maleic acid and 2-acrylamide-2-methylpropanesulfonic acid are not dissolvable into a hydrocarbon solvent such as n-hexane, they cannot be used. An alcohol solvent such as methanol can be used. Especially, methanol is suitable because it dissolves vinyl monomers with quaternary ammonium salt groups therein at a high level. Since some monomers cause a chemical reaction with solvents in the same manner as that in the suspension polymerization method, close attention must be paid to the choice of monomers.

In contrast to water in which the solubility of monomers are poor, even when vinyl chloride and/or monomers having an ability of polymerization are added to a solution containing a solvent during polymerization, the monomer can be quickly dissolved, resulting in a solution having a uniform composition. Therefore, when the copolymer is prepared with monomers having an ability of polymerization, e.g., (meth)acrylic ester, the monomer reactivity ratio of which is larger than that of vinyl chloride, the composition of each monomer in the reacting system can be maintained to be constant during polymerization, if this solution is properly added according to the progress of the reaction conditions. The resulting copolymer has a uniform composition.

Polymerization is performed using the above-mentioned monomers, which become a composition unit of the vinyl chloride copolymer, an initiator and the above-mentioned organic solvent. As the initiator, organic peroxides or azo compounds, which are usually used for the polymerization, are employed.

As the fluororesin used for coating of the reacting apparatus, any product which is available on the market can be used, examples of which are as follows: polytetrafluoroethylene (teflon TFE; Dupon Co., Ltd.), tetrafluoroethylene-hexafluoropropylene copolymer (teflon FEP; Dupon Co., Ltd.), ethylenetetrafluoroethylene copolymer (aflon COP; Asahi Glass Co., Ltd.), tetrafluoroethylene-perfluoroalkoxyethylene copolymer (PFA; Mitsui Fluorochemical Co., Ltd.), polytrifluoroethylene chloride (CTFE), and polyfluorovinylidene (PVdF). The inside of the reacting apparatus which comes into contact with the reacting solution is usually coated with these powdered fluororesins and sintered. The thickness of the coated film is desired to be in the range of 0.1 to 1.0 mm. The use of the reacting apparatus coated with a fluororesin provides very little adhesion of deposited scales to the apparatus and separation of the produced copolymer as a powdered precipitate. Thus, the disadvantages that the copolymer cannot be prepared with a uniform composition and the initiator is incorporated into the scale and cannot function as an initiator are removed. The separated copolymer can be readily removed from the reacting apparatus. The inside of the reacting apparatus can be coated with a fluororesin as desired, not only to provide additional strength, but also to line the reacting apparatus and function as a packing material Especially, ethylenetetrafluoroethylene copolymer and tetrafluoroethyleneperfluoroalkoxyethylene copolymer can produce a thick and tenacious film on the interior surface of a reacting apparatus. By the powder coating technique, a fluororesin film can be readily formed on the interior surface of the reacting apparatus, even one having a complicated shape. Since such a fluororesin film is excellent in resistance to organic solvents, resistance to acids, resistance to alkalies, etc., it will not corrode, no matter what solvents and monomers are used in the method of this invention.

Such a reacting apparatus coated with a fluororesin can effectively prevent deposited scales from arising in the solution polymerization method, especially in the precipitation polymerization method. When copolymerization is performed by the suspension polymerization method in this reacting apparatus, a large amount of deposited scales arises and adheres to the apparatus.

According to this precipitation polymerization method, the copolymer can be obtained generally in a fine-powdered form. The average degree of polymerization in the copolymer is preferably in the range of about 150 to about 600 from the viewpoint of both the mechanical strength of the binder and the characteristics of the magnetic coating. If the average degree of polymerization is less than 150, when this copolymer is coated on a substrate together with magnetic powder, the copolymer film (i.e., a magnetic layer) obtained becomes weak, causing difficulties in practical use. When the average degree of polymerization is over 600, the solution viscosity of this copolymer is so high that the efficiency of the coating process is decreased.

Some examples of isocyanate compounds, which are kneaded with magnetic powder together with the above-mentioned copolymer when the abrasion resistance and heat-resistance of the resulting magnetic layer are raised, are as follows: tolylenediisocyanate, diphenylmethanediisocyanate, dianisidinediisocyanate, hexamethylenediisocyanate, methaxylylenediisocyanate, and a product of 1 mol of trimethylolpropane with 3 mol of tolylenediisocyanate. This product is available from, for example, Japan Polyurethane Industry Co., Ltd., under the name of "Coronate L".

When the amount of isocyanate compounds used is excessive, the crosslinking density increases so that the coated film obtained finally hardens and becomes brittle. When the amount of isocyanate compounds is too small, the expected effects cannot be attained. Therefore, the said amount is usually set to be in the range of 0.3 to 30 parts by weight for 100 parts by weight of the above-mentioned copolymer.

The production of the magnetic coating from the resin of this invention is performed as follows: For example, the above-mentioned vinyl chloride copolymer is dissolved in a mixed solvent of methylisobutyl ketone and toluene. To the resulting solution, magnetic powder material such as γ-iron oxide is added together with an additive such as surfactant, kneaded, and dispersed. When an increase in the abrasion resistance of the magnetic layer is particularly important, an isocyanate compound is added to this solution, resulting in a magnetic coating.

However, the order of addition and the method of dispersion of the above-mentioned copolymer, isocyanate compound and magnetic powdered material in this invention are not limited The solvent which dissolves the above-mentioned copolymer so as to produce the resin of this invention is one selected from the groups consisting of toluene, methylethyl ketone, methylisobutyl ketone, and cyclohexanone, or a mixture thereof. The copolymer is usually used in the range of 10 to 100 parts by weight for 100 parts by weight of the magnetic powdered material. The magnetic coating is usually prepared so as to contain the copolymer at a concentration of 5 to 30% by weight.

EXAMPLES

Squareness ratio

Magnetic coating to which isocyanate compounds had been added as desired was coated on a polyester film as a substrate of 25 μm thickness so as to form a magnetic film with a dry thickness of 6 μm, oriented, and dried, resulting in a magnetic recording medium, the squareness ratio (Br/Bm, where Br and Bm denote the residual flux density and the saturation flux density, respectively) of which was then measured When the squareness ratio is around 0.8 or more, the dispersion of the magnetic powder becomes remarkably high.

Degree of Gloss

The reflective index of rays of light that were incident upon the magnetic film at an angle of 60, which had been subjected to the measurement of the squareness ratio, was measured by a glossmeter and the degree of gloss was evaluated on the basis of the obtained value. The degree of gloss exhibits not only smoothness on the surface of the magnetic film but also an index of the dispersion characteristics of the magnetic powder in the magnetic film.

Thermocontact

In order to evaluate the thermocontact characteristics, examinations were carried out to check whether or not the magnetic layers adhere to each other when two magnetic recording media were heated at a temperature of 120° C. for 15 min and then overlapped so as to have the magnetic layers face each other. In Table 1, O denotes non-adhesiveness (blocking does not occur) and X adhesiveness.

Gel fraction

A vinyl chloride copolymer film which contains no magnetic powder was immersed overnight in a mixed solvent of toluene-methylisobutylketone (weight ratio 1:1) at 50° C. The value obtained by dividing the weight of the immersed film by the weight of a film that has not yet been immersed was considered to be a gel fraction, which is an index of efficiency, etc., of the crosslinking reaction between the copolymer and the isocyanate compounds.

EXAMPLE 1

Initial preparation

The interior surface of an autoclave with an agitator, the volume of which is 20 l, the agitation wings and the surface of the baffle were coated with tetrafluoroethylene-perfluoroalkoxyethylene copolymer (PFA; Mitsui Chlorochemical Co., Ltd.) and sintered to form a coated film thereon. After the autoclave with the interior surface coated with the fluororesin was charged with 8100 g of methanol (first grade reagent) and 25 g of α-cumylperoxyneodecanoate as a polymerization initiator, the air inside of the autoclave was removed by evacuation using an aspirator for 5 min. The autoclave was then charged with 2600 g of vinyl chloride.

Post-preparation

After the air inside of a stainless vessel, which can be hung, with the volume of 3 l (referred to as a feeding vessel) was removed, a mixed solution of 259 g of 2-hydroxypropylacrylate dissolved in 500 g of methanol and 15 g of methacryloyloxyethyltrimethylammonium chloride was charged into the vessel, and then 1045 g of vinyl chloride was injected in this vessel.

This vessel was shaken so as to mix and dissolve the contents and then hung on a spring scale. Then, it was connected to a nozzle of the autoclave through a valve at the bottom of the vessel using a flexible tube.

Polymerization treatment

The number of rotations of the agitator of the autoclave was set to be 380 rpm and the temperature inside of the autoclave was increased to be 43° C. by hot water flowing through the jacket. Polymerization was initiated as soon as the internal temperature rose to 43° C., and accordingly the internal temperature was maintained to be 43° C. for the succeeding polymerization.

When the internal temperature attained 43° C., 50 g of a mixed monomer solution was supplied to the autoclave from the feeding vessel, and then a certain amount of the solution was supplied in installments, that is, four times of 46 g each at 5 min. intervals, eight times of 31 g each at 10 min. intervals, or forty nine times of 27 g each at 5 min. intervals, depending upon the progress of polymerization. Ten minutes after the last addition, the autoclave was cooled to 25° C. and the polymerization was terminated. The pressure inside of the autoclave was 2.0 kg/cm$^2$G at the initial stage and 1.8 kg/cm$^2$G at the final stage.

After cooling, unreacted vinyl chloride was degassed and substantially removed by the feeding of nitrogen gas thereinto, and then methanol slurry of the copolymer was removed from the autoclave, followed by filtration and drying under reduced pressure at 50° C. for 24 hours, resulting in 1200 g of white powdered copolymer A.

The resulting resin had a polymerization degree of 300 and was composed of 86.5% of vinyl chloride, 13.0% of 2-hydroxypropylacrylate, and 0.5% of methacryloyloxyethyltrimethylammonium chloride. After the polymerization, adhesion of deposited scales to the interior surface of the reacting apparatus, the stirring wings and the surface of the baffle was not observed. Dissolution of the resin in a mixed solvent of methylisobutyl ketone-toluene (1:1) at 10% by weight afforded a clear solution without residue.

The copolymer A was dissolved in a solution of toluene and methyl isobutyl ketone (weight ratio 1:1) to prepare a copolymer solution containing the copolymer A in a concentration of 15%. To this copolymer solution, 80 parts by weight of Co-γ-iron oxide (magnetic powder per 20 parts by weight of the copolymer dissolved in the solution and stainless balls having a diameter of ⅜ inches in an amount eight times that of the magnetic powder were added and mixed by a paint conditioner (Reddevil Co., Ltd.) for 6 hours to provide a magnetic coating, followed by preparing a magnetic recording medium, the squareness ratio of which was then determined to be as high as 0.82. The degree of gloss thereof was determined to be 96%.

EXAMPLE 2

The reacting apparatus, in which the interior surface, agitating wings and the baffle surface were coated with ethylene-tetrafluoroethylene copolymer (aflon COP; Asahi Glass Co., Ltd.), was charged with the same monomers as those in Example 1 in the same manner as in Example 1 and polymerization was carried out in the same manner as in Example 1, wherein the amounts of monomers, methanol and initiator were changed. A powdered copolymer B was obtained, first, and the composition of this copolymer was then analyzed. Then, a magnetic recording medium was prepared in the same manner as in Example 1 and the squareness ratio thereof was determined, the results of which are shown in Table 1. Moreover, as a fluororesin, tetrafluoroethylene-hexafluoropropylene copolymer (teflon FEP; Dupon Co., Ltd.) was used in place of ethylene-tetrafluoroethylene copolymer and, in the same manner as in the preparation of the copolymer B, copolymers C, D, E, F, and G, the composition of each of which is indicated in Table 1, were obtained to prepare the magnetic recording media corresponding thereto. Their squareness ratios are greater than 0.80 as shown in Table 1 and the degrees of gloss are greater than 90%.

In any case, adhesion of deposited scales to the interior surface of the reacting apparatus, the agitating wings and the surface of the baffle was not substantially observed. The solvent solubility test was carried out in the same manner as in Example 1, resulting in a colorless clear solution.

TABLE 1

| | Copolymers | | | | | |
|---|---|---|---|---|---|---|
| | B | C | D | E | F | G |
| Copolymer Compositions (parts) | | | | | | |
| Vinyl Chloride | 85.9 | 84.5 | 86.3 | 85.5 | 85.7 | 79.8 |
| Vinyl Monomer with Hydroxyl Group | | | | | | |
| 2-Hydroxyethylacrylate | | | 13.1 | | 13.4 | |
| 2-Hydroxypropylacrylate | 13.0 | 13.4 | | 13.5 | | 17.3 |
| Vinyl Monomer with Quaternary Ammonium Salt Group | | | | | | |
| Methacryloyloxyethyltrimethyl-ammonium Chloride | 1.1 | 2.1 | 0.6 | | | 2.9 |
| Trimethyl-3-methacrylamide-propylammonium Chloride | | | | 1.0 | 0.9 | |
| Average Degree of Polymerization | 310 | 300 | 310 | 310 | 300 | 300 |
| Physical Property | | | | | | |
| Squareness Ratio | 0.82 | 0.82 | 0.83 | 0.83 | 0.83 | 0.82 |
| Degree of Gloss (%) | 97 | 94 | 96 | 96 | 95 | 95 |
| Adhesion of Scales | None | None | None | None | None | None |
| Solubility Test | Completely dissolved in a Solvent | Completely dissolved in a Solvent | Completely dissolved in a Solvent | Completely dissolved in a Solvent | Completely dissolved in a Solvent | Completely dissolved in a Solvent |

EXAMPLE 3

A copolymer H was obtained in the same manner as in Example 1 except that as the succeeding preparation process, a mixed solution, prepared by dissolving 244 g of 2-hydroxypropylacrylate, 15 g of methacryloyloxyethyltrimethylammonium chloride, and 15 g of acid phosphoxyethylmethacrylate in 500 g of methanol, was charged into the stainless vessel and then 1045 g of vinyl chloride was injected into the vessel under pressure.

The resulting resin had a polymerization degree of 300 and was composed of 86.5% of vinyl chloride, 12.5% of 2-hydroxypropylacrylate, and 0.5% of methacryloyloxyethyltrimethylammonium chloride, and 0.5% of acid phosphoxyethylmethacrylate. After the polymerization, adhesion of the scales to the interior surface of the reacting apparatus, the stirring wings and the surface of the baffle was not observed. Dissolution of the resin in a mixed solvent of methylisobutyl ketone-toluene (1:1) in the 10% by weight afforded a clear solution without residue.

The copolymer H was dissolved in a mixed solvent of toluene and methyl isobutyl ketone (weight ratio 1:1) to prepare a copolymer solution containing the copolymer A in a concentration of 15%. To this copolymer solution, 80 parts by weight of Co-γ-iron oxide (magnetic powder per 20 parts by weight of the copolymer dissolved in the solution and stainless balls having a diameter of ⅛ inches in an amount eight times that of the magnetic powder were added and mixed by a paint conditioner (Reddevil Co., Ltd.) for 6 hours to provide a magnetic coating, followed by preparing a magnetic recording medium, the squareness ratio of which was then determined to be as high as 0.84. The degree of gloss thereof was determined to be 108%.

EXAMPLE 4

The reacting apparatus, in which the interior surface, agitating wings and the baffle surface were coated with ethylene-tetrafluoroethylene copolymer (aflon COP; Asahi Grass Co., Ltd.), was charged with the same monomers as those in Example 3 in the same manner as in Example 3 and polymerization was carried out in the same manner as in Example 1, wherein the amounts of monomers, methanol and initiator were changed. A powdered copolymer I was obtained, first, and the composition of this copolymer was then analyzed. Then, a magnetic recording medium was prepared in the same manner as in Example 1 and the squareness ratio thereof was determined, the results of which are shown in Table 2. Moreover, as a fluororesin, tetrafluoroethylene-hexafluoropropylene copolymer (teflon FEP; Dupon Co., Ltd.) was used in place of ethylene-tetrafluoroethylene copolymer and, in the same manner as in the preparation of the copolymer B, copolymers J, K, L, and M, the composition of each of which is indicated in Table 2, were obtained to prepare the magnetic recording media corresponding thereto. Their squareness ratios are greater than 0.80 as shown in Table 2 and the degrees of gloss are greater than 100%.

In any case, adhesion of deposited scales to the interior surface of the reacting apparatus, the agitating wings and the surface of the baffle was not substantially observed The solvent solubility test was carried out in the same manner as in Example 1, resulting in a colorless clear solution.

TABLE 2

| | Copolymers | | | | |
|---|---|---|---|---|---|
| | I | J | K | L | M |
| Copolymer Compositions (parts) | | | | | |
| Vinyl Chloride | 85.0 | 83.8 | 84.3 | 85.6 | 82.9 |
| Vinyl Monomer with Hydroxyl Group | | | | | |
| 2-Hydroxyethylacrylate | 13.0 | 13.0 | 13.5 | 13.2 | 13.1 |
| Vinyl Monomer with Quaternary Ammonium Salt Group | | | | | |
| Methacryloyloxyethyltrimethyl-ammonium Chloride | 1.0 | 1.6 | 1.1 | 0.6 | 2.0 |
| Vinyl Monomer with Acid Radical | | | | | |

TABLE 2-continued

| | Copolymers | | | | |
|---|---|---|---|---|---|
| | I | J | K | L | M |
| Acid Phosphoxyethylmethacrylate | 1.0 | 1.6 | | | 2.0 |
| Maleic Acid | | | 1.1 | 0.6 | |
| Average Degree of Polymerization | 340 | 350 | 340 | 360 | 330 |
| Physical Property | | | | | |
| Squareness Ratio | 0.85 | 0.84 | 0.83 | 0.83 | 0.84 |
| Degree of Gloss (%) | 110 | 108 | 105 | 104 | 110 |
| Adhesion of Scales | None | None | None | None | None |
| Solubility Test | Completely dissolved in a Solvent | Completely dissolved in a Solvent | Completely dissolved in a Solvent | Completely dissolved in a Solvent | Completely dissolved in a Solvent |

EXAMPLE 5

The copolymer A obtained in Example 1 and the copolymers B to G obtained in Example 2 were dissolved, respectively, in a mixed solvent of toluenemethylisobutyl ketone (weight ratio 1:1), resulting in copolymer solutions in concentration of 15%.

To each of the copolymer solutions, 80 parts by weight of Co-γ-iron oxide (magnetic powder) per 20 parts by weight of the copolymer dissolved in the solution and stainless balls having a diameter of ⅛ inches in an amount eight times that of the magnetic powder were added and mixed by a paint conditioner for 6 hours, and then 0.65 parts by weight of an isocyanate compound (Coronate L, Japan Polyurethane Industry Co., Ltd.) were added thereto and stirred, resulting in a magnetic coating corresponding to each of the copolymers A to G. These coatings were applied to polyester films, aligned, and dried to prepare magnetic recording media in which the crosslinking reaction had substantially proceeded. The squareness ratios, the degrees of gloss, and thermocontact characteristics of these magnetic recording media are shown in Table 3. Gel fractions, which represented the crosslinking reactivity between each copolymer and the isocyanate, are also shown in Table 3.

TABLE 3

| Copolymers | A | B | C | D | E | F | G |
|---|---|---|---|---|---|---|---|
| Squareness Ratio | 0.82 | 0.81 | 0.82 | 0.82 | 0.81 | 0.82 | 0.81 |
| Degree of Gloss (%) | 95 | 97 | 95 | 96 | 93 | 95 | 96 |
| Thermocontact | O | O | O | O | O | O | O |
| Gel Fraction (%) | 81 | 82 | 82 | 80 | 81 | 81 | 92 |

EXAMPLE 6

The copolymer H obtained in Example 3 and the copolymers I to M obtained in Example 4 were dissolved, respectively, in a mixed solvent of toluenemethylisobutyl ketone (weight ratio 1:1), resulting in copolymer solutions in concentration of 15%.

To each of the copolymer solutions, 80 parts by weight of Co-γ-iron oxide (magnetic powder) per 20 parts by weight of the copolymer dissolved in the solution and stainless balls having a diameter of ⅛ inches in an amount eight times that of the magnetic powder were added and mixed by a coating conditioner for 6 hours, and then 0.65 parts by weight of an isocyanate compound (Coronate L, Japan Polyurethane Industry Co., Ltd.) were added thereto and stirred, resulting in a magnetic coating corresponding to each of the copolymers H to M. These coatings were applied to polyester films, aligned, and dried to prepare magnetic recording media in which the crosslinking reaction had substantially proceeded. The squareness ratios, the degrees of gloss, and thermocontact characteristics of these magnetic recording media are shown in Table 4. Gel fraction, which represented the crosslinking reactivity between each copolymer and the isocyanate, are also shown in Table 4.

TABLE 4

| Copolymers | H | I | J | K | L | M |
|---|---|---|---|---|---|---|
| Squareness Ratio | 0.83 | 0.83 | 0.84 | 0.82 | 0.83 | 0.83 |
| Degree of Gloss (%) | 110 | 108 | 109 | 105 | 110 | 105 |
| Thermocontact | O | O | O | O | O | O |
| Gel Fraction (%) | 84 | 83 | 85 | 82 | 84 | 83 |

Control 1

Reference standard magnetic recording media were prepared, in the same manner as in the above-mentioned examples, using a vinyl chloride/2-hydroxypropylacrylate copolymer a (the average degree of polymerization of which was 350 and which contained 13.0% by weight of 2-HPA) which were produced in the same manner as in the preparation of the resin A of Example 1, and a vinyl chloride/vinyl acetate/vinyl alcohol copolymer b (the composition ratio of which was 91/3/6 in this order). The squareness ratios of the magnetic recording media were determined to be 0.75 and 0.76, respectively. The degrees of gloss thereof were as low as 52% and 54%, respectively.

Control 2

In respect to the copolymer b used in Control 1, a reference standard magnetic recording medium was prepared in the same manner as in Example 2 and was subjected to a thermocontact test, which resulted in a blocking phenomenon.

Control 3

A vinyl chloride copolymer was prepared in the same manner as in Example 1 except for the use of a reacting apparatus, the interior surface of which was not coated with a fluororesin. It was observed that deposited scales having a thickness of about 5 mm adhered to the interior surface of the reacting apparatus. It was also observed that the scales adhered to the surface of the baffle as well as to the agitating wings. These deposited scales were scraped away with a scraper and were subjected to a solvent solubility test, which resulted in a cloudy solution, indicating that a portion of deposited scales is not solvent-soluble.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A resin used for magnetic recording media, said resin comprising:
a vinyl chloride copolymer in an amount in the range of 60 to 95% by weight, containing vinyl monomers with hydroxyl groups in an amount in the range of 1 to 30% by weight, vinyl monomers with quaternary ammonium salt groups, and vinyl monomers having phosphoric groups as component units wherein each are present in an amount in the range of 0.05 to 8% by weight and the total content of both is in the range of 0.1 to 10% by weight.

2. A resin used for magnetic recording media according to claim 1, wherein the average degree of polymerization in said vinyl chloride copolymer is in the range of about 150 to about 600.

* * * * *